(12) United States Patent
Aras et al.

(10) Patent No.: US 12,153,656 B2
(45) Date of Patent: Nov. 26, 2024

(54) BIOMETRIC-BASED GRADED AUTHENTICATION SYSTEMS AND METHODS

(71) Applicant: ARIZONA BOARD OF REGENTS ON BEHALF OF THE UNIVERSITY OF ARIZONA, Tucson, AZ (US)

(72) Inventors: Shravan Aras, Tucson, AZ (US); Chris Gniady, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 456 days.

(21) Appl. No.: 17/523,507

(22) Filed: Nov. 10, 2021

(65) Prior Publication Data

US 2022/0253513 A1      Aug. 11, 2022

Related U.S. Application Data

(60) Provisional application No. 63/112,049, filed on Nov. 10, 2020.

(51) Int. Cl.
  *G06F 21/32*      (2013.01)
  *G06F 21/62*      (2013.01)

(52) U.S. Cl.
  CPC ............ *G06F 21/32* (2013.01); *G06F 21/629* (2013.01)

(58) Field of Classification Search
  CPC .............................. G06F 21/629; G06F 21/32
  USPC ......................................................... 726/19
  See application file for complete search history.

(56) References Cited

U.S. PATENT DOCUMENTS

2018/0293988 A1* 10/2018 Huang .................... G10L 17/20
2019/0357015 A1* 11/2019 Wheeler ................ G06V 20/64

OTHER PUBLICATIONS

Ahonen, et al., "Face Description with Local Binary Patterns: Application to Face Recognition", IEEE Transactions on Pattern Analysis and Machine Intelligence, vol. 28, No. 12, Dec. 2006, pp. 2037-2041.
Ahonen, et al., "Face Recognition with Local Binary Patterns", ECCV 2004, LNCS 3021, pp. 469-481.

(Continued)

*Primary Examiner* — Anthony D Brown
(74) *Attorney, Agent, or Firm* — Grossman, Tucker, Perreault & Pfleger, PLLC (57) ABSTRACT

Biometric-based graded authentication provides a passive, graded authentication system, which uses face authentication to provide users access to their devices without requiring manual interaction with the lock screen. Biometric-based graded authentication permits users to categorize applications into various security bins based on their sensitivity. By doing so biometric-based graded authentication method grants access to different sensitivity applications, based on varying degrees of confidence in user authentication. Thus, allowing the device to be used even in adverse lighting conditions without hampering user experience. While the use of face authentication is used to discuss the system, biometric-based graded authentication as disclosed herein may be used with any confidence-based biometric system.

12 Claims, 6 Drawing Sheets

(56) References Cited

OTHER PUBLICATIONS

Ben-Asher, et al., "ON the Need for Different security Methods on Mobile Phones", In Proceedings of the 13th International Conference on Human Computer Interaction with Mobile Devices and Services. ACM, Aug. 30-Sep. 2, 2011, Stockholm, Sweden, pp. 465-473.

Bhattacharyya, et al., "Biometric Authentication: A Review", International Journal u- and e-Service, Science and Technology, vol. 2, No. 3, Sep. 2009, pp. 13-28.

Breitinger, et al., "User Survey on Phone Security and Usage", Conference Paper: BIOSIG, Darmstadt, Germany, Jan. 2020, pp. 139-144.

Brooke, "SUS: a 'Quick and Dirty' Usability Scale", Usability Evaluation in Industry, 1996, Taylor and Francis Publishing, Chapter 23, pp. 188-194.

Cootes, et al., "Active Appearance Models", IEEE Transactions on Pattern Analysis and Machine Intelligencce, vol. 23, No. 6, Jun. 2001, pp. 681-685.

Cranor, et al., "Security and Usability", O'Reilly, Aug. 2005, downloaded from lib.ommolketab.ir, 847 pages.

Dörflinger, et al., "My Smartphone is a Safe! The User's Point of View Regarding Novel Authentication Methods and Gradual Security Levels on Smartphones", Conference: SECRYPT 2010—Proceedings of the International Conference on Security and Cryptography, Athens, Greece, Jul. 26-28, 2010, 10 pages.

Memmi, et al., "Mobile Computing, Applications, and Services", 5th International Conference, MobiCASE 2013, Paris, France, Nov. 7-8, 2013, Springer, pp. 1-331.

Feng, et al., "Continuous Mobile Authentication using Touchscreen Gestures", Nov. 2012, Conference: Homeland Security (HST), IEEE Conference on Technologies, pp. 1-6.

Fisher, "The Use of Multiple Measurements in Taxonomic Problems", Annals of Eugenics, 7, 2, Sep. 1936, pp. 179-188.

Gollmann, "Computer Security", Wiley Interdisciplinary Reviews: Computational Statistics, vol. 2, Sep./Oct. 2010, pp. 544-554.

Hearst, "Support Vector Machines", IEEE Intelligent Systems and their Applications, 13, 4, Jul./Aug. 1998, pp. 18-28.

Matas, et al., "Comparison of Face Verification Results on the XM2VTS Database", in Pattern Recognition, 2000, Proceedings. 15th International Conference, vol. 4, IEEE, pp. 858-863.

Milborrow, et al., "The MUCT Landmarked Face Database", Pattern Recognition Association of South Africa, Dec. 2008, 6 pages.

Niinuma, et al, "Continuous User Authentication Using Temporal Information", Biometric Technology for Human Identification VII, Proc. of SPIE, vol. 7667, 2010, pp. 1-11.

OpenCV4Android SDK—OpenCV 2.4.13.7 documentation, 2018, https://docs.opencv.org/2.4/doc/tutorials/introduction/android_binary_package/O4A_SDK.html, pp. 1-7.

OpenCV—Open Computer Vision Library, https://opencv.org, 2024, pp. 1-7.

Ritchie, et al., "The UNIX Time-Sharing System", Communications of the ACM, vol. 17, No. 7, Jul. 1974, pp. 365-375.

Shi, et al., "SenGuard: Passive User Identification on Smartphones Using Multiple Sensors", 2011 IEEE 7th International Conference on Wireless and Mobile Computing, Networking and Communications (WiMob), downloaded on Mar. 28, 2024, pp. 141-148.

Shneiderman, et al., "Designing the User Interface", Strategies for Effective Human-Computer Interaction, Fourth Edition, Jan. 1987, pp. 1-651.

Trewin, "Biometric Authentication on a Mobile Device: A Study of User Effort, Error and Task Disruption", ACSAC, Dec. 3-7, 2012, Orlando, Florida, pp. 159-168.

Turk, et al., "Eigenfaces for Recognition", Journal of Cognitive Neuroscience, vol. 3, No. 1, 1991, pp. 71-86.

Xu, et al. "Towards Continuous and Passive Authentication via Touch Biometrics: An Experimental Study on Smartphones", USENIX Association, Tenth Symposium on Usable Privacy and Security, Jul. 9-11, pp. 187-198.

Zhu, et al., "SenSec: Mobile Security through Passive Sensing", 2013 International Conference on Computing, Networking and Communications (ICNC), pp. 1128-1133.

Aras, et al., "MultiLock: Biometric-Based Graded Authentication for Mobile Devices", MOBIQUITOUS' 19, Nov. 12-14, 2019, Huston, TX.

* cited by examiner

BIOMETRIC-BASED GRADED AUTHENTICATION SYSTEMS AND METHODS

TECHNICAL FIELD

The present disclosure relates to systems and methods for providing biometric authentication in portable electronic devices, more specifically to providing graded access to portable electronic device functionality using biometric input data.

BACKGROUND

Portable electronic devices are ubiquitous in today's world. They are used everywhere, for communication, entertainment, commerce, navigation and so on. Portable electronic devices are used for many different purposes, from trivial time checking to complex high-security banking operations. This growing reliance on portable electronic devices for everyday tasks has also resulted in the need for better authentication in order to secure access to the portable electronic device and to prevent unauthorized use of applications sensitive to privacy such as banking or communication. There are various forms of authentication available to users ranging from simple memorization of pins, passwords or patterns to biometric forms of authentication. While proper authentication represents an indispensable step in system security, such authentication often requires users to perform additional tasks before they can use the portable electronic device for even trivial tasks such as weather checking.

Currently, the most popular means of securing portable electronic devices from unauthorized access is by using a pin or password. However, many users find these methods cumbersome, and some opt to disable them as a result. Studies have indicated that up to 40% of the users leave their portable electronic device unprotected because they felt it more convenient than setting a pin, while 3% of users indicated that it was simply too difficult to memorize a pin.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

Although the following Detailed Description will proceed with reference being made to illustrative embodiments, many alternatives, modifications and variations thereof will be apparent to those skilled in the art.

DETAILED DESCRIPTION

Due to the resistance to PIN or password based user authentication, various biometric forms of user authentication have been proposed, with face-based authentication and fingerprint scanning proving to be more widely accepted than others. Fingerprint scanning, however, requires additional hardware which has led to a slower adoption rate. Face detection, on the other hand, can make use of the existing front-facing camera found on most current portable electronic devices.

The primary aim of a face authentication system is to confirm or deny the identity claimed by the device user, thereby allowing the user access to a protected resource upon validation. This is in contrast to a face recognition system which attempts to establish the identity of a given person out of a closed pool of individuals. While most face authentication systems use well-established algorithms, in common, they introduce a confidence parameter which determines the security of the system. Typically portable electronic devices request the user to authenticate once, while unlocking the portable electronic device, by positioning their face in front of the front-facing camera until the device positively detects the user or falls back to a more traditional approach such as pin or password. The tolerance for false positive in such systems may be controlled by varying the confidence threshold. The higher or greater the confidence threshold, the lower the probability of an unauthorized individual being mistaken as an authorized user of the device. Successful authentication is also dependent on other factors such as the time for which the user faces the camera, good lighting, proper alignment, unaltered look (such as sunglasses, hats, etc.) and so on. Thus, when the user has to be authenticated, all these factors force the user to deviate from normal interaction with the portable electronic device.

The systems and methods disclosed herein reduce the burden of facial authentication, as outlined above, while still providing highly secure authentication for accessing sensitive applications. The systems and methods disclosed herein take into consideration that not all applications require the same level of security. In everyday scenarios, a variety of applications may be accessed, and not all of the applications may be considered equally sensitive by the device user. While a user may deem applications related to finance or privacy like emails as sensitive, applications like games may not be thought as equally sensitive. Thus, varying levels of security may be defined for different applications, a concept referred to as graded security or multilevel security. The use of the graded security systems and methods disclosed herein allow users to quickly unlock the phone and access low sensitivity applications while monitoring user's faces and authenticating them in the background. The systems and methods disclosed herein beneficially use the time required for a user to access a more sensitive application, for example by potentially scrolling through several application pages on their phones, to observe the user's face and authenticate to the level required by the more sensitive applications. The systems and methods disclosed herein beneficially and advantageously provide a graded security authentication framework using facial authentication to improve usability of portable electronic devices. The systems and methods disclosed herein do not inconvenience many users since most users do not access sensitive applications the great majority of the time. IN addition, the systems and methods disclosed herein beneficially and advantageously perform a majority of the authentication effort in the background. Beneficially, the systems and methods disclosed herein are not limited to face recognition, but may be applied to any confidence based system, where the true user guarantee can be quantified. For example, technologies like iris and fingerprint scanning, which determine if the true user is using device by producing a confidence value based on collected biometric data, may benefit from the use of the systems and methods disclosed herein.

One advantage of using biometric authentication methods on portable electronic devices is the lack of need for the user to recall passcodes or gestures to unlock the device. By using biometric authentication methods such as facial recognition, users can ideally, unlock their portable electronic device by merely looking at it. However, in practice using facial recognition as an authentication method can be cumbersome for users and take considerable time to unlock the device. The majority of response time for using facial authentication is used to provide the system with a biometric sample for authentication (not including processing time) as the facial recognition relies heavily on the user correctly positioning the device camera such that an image that includes the entire face is acquired, stabilizing the camera and having the ambient lighting that was adequate to provide an acceptable image. Two insights assist implementation of the systems and methods disclosed herein. First, a significant number of applications are not considered "sensitive applications" by a large number of users and, consequently, require minimal, if any, security measures. Second, many users tend to use their portable electronic devices for non-sensitive applications prior to opening or accessing high or moderate sensitivity applications. Together, these insights permit the performance of facial authentication in the background, while users interact with non-sensitive or low security applications. Thus, the systems and methods disclosed herein beneficially reduce the obtrusiveness of facial based authentication while improving user experience.

A graded-security system for providing access to portable electronic device applications is provided. The system may include: biometric authentication circuitry to: execute one or more biometric identification algorithms as a passive background process; and generate a plurality of confidence values for a device user, each of the plurality of confidence values associated with device user biometric data included in a respective ones of a plurality of device user biometric inputs; and security manager circuitry to: determine a sensitivity level associated with a requested application responsive to receipt of a user input to access the requested application; and compare the determined sensitivity level associated the requested application with a false access rate corresponding to the lowest confidence value included in the plurality of confidence values.

A graded-security method for providing access to portable electronic device applications is provided. The method may include: executing, by biometric authentication circuitry, one or more biometric identification algorithms as a passive background process; acquiring, via one or more device user biometric input devices, a plurality of biometric inputs, wherein each of the biometric inputs includes biometric data associated with a user of the device; generating, by the biometric authentication circuitry, a plurality of confidence values, each of the plurality of confidence values associated with a respective one of the plurality of biometric inputs that includes the biometric data associated with the user of the device; determining, by security manager circuitry, a sensitivity level associated with a requested application responsive to receipt of a user input to access the requested application; and comparing, by the security manager circuitry, the sensitivity level associated the requested application with a false access rate corresponding to the lowest confidence value included in the plurality of confidence values.

A non-transitory machine-readable storage medium that includes instructions is provided. The instructions, when executed by processor circuitry included in a portable electronic device, may cause the processor circuitry to: cause biometric authentication circuitry to execute one or more biometric identification algorithms as a passive background process; acquire, via one or more device user biometric input devices, a plurality of biometric inputs, wherein each of the plurality of biometric inputs includes biometric data associated with a user of the device; generate, by the biometric authentication circuitry, a plurality of confidence values, each of the plurality of confidence values associated with a respective one of the plurality of biometric inputs that includes the biometric data associated with the user of the device; wherein each of the plurality of confidence values includes data indicative of a reliability of an identification of the user of the device; cause the security manager circuitry to determine a sensitivity level associated with a requested application responsive to receipt of a user input to access the requested application; and cause the security manager circuitry to compare the sensitivity level associated with a false access rate associated with the lowest confidence value included in the plurality of confidence values.

A portable electronic device is provided. The portable electronic device may include: an image acquisition device; a display device; data storage circuitry; and processor circuitry that includes biometric authentication circuitry and security manager circuitry; biometric authentication circuitry to: execute one or more biometric identification algorithms as a passive background process; and generate a plurality of confidence values for a device user, each of the plurality of confidence values associated with device user biometric data included in a respective ones of a plurality of device user biometric inputs; and security manager circuitry to: determine a sensitivity level associated with a requested application responsive to receipt of a user input to access the requested application; and compare the determined sensitivity level associated the requested application with a false access rate corresponding to the lowest confidence value included in the plurality of confidence values.

Figure 1:
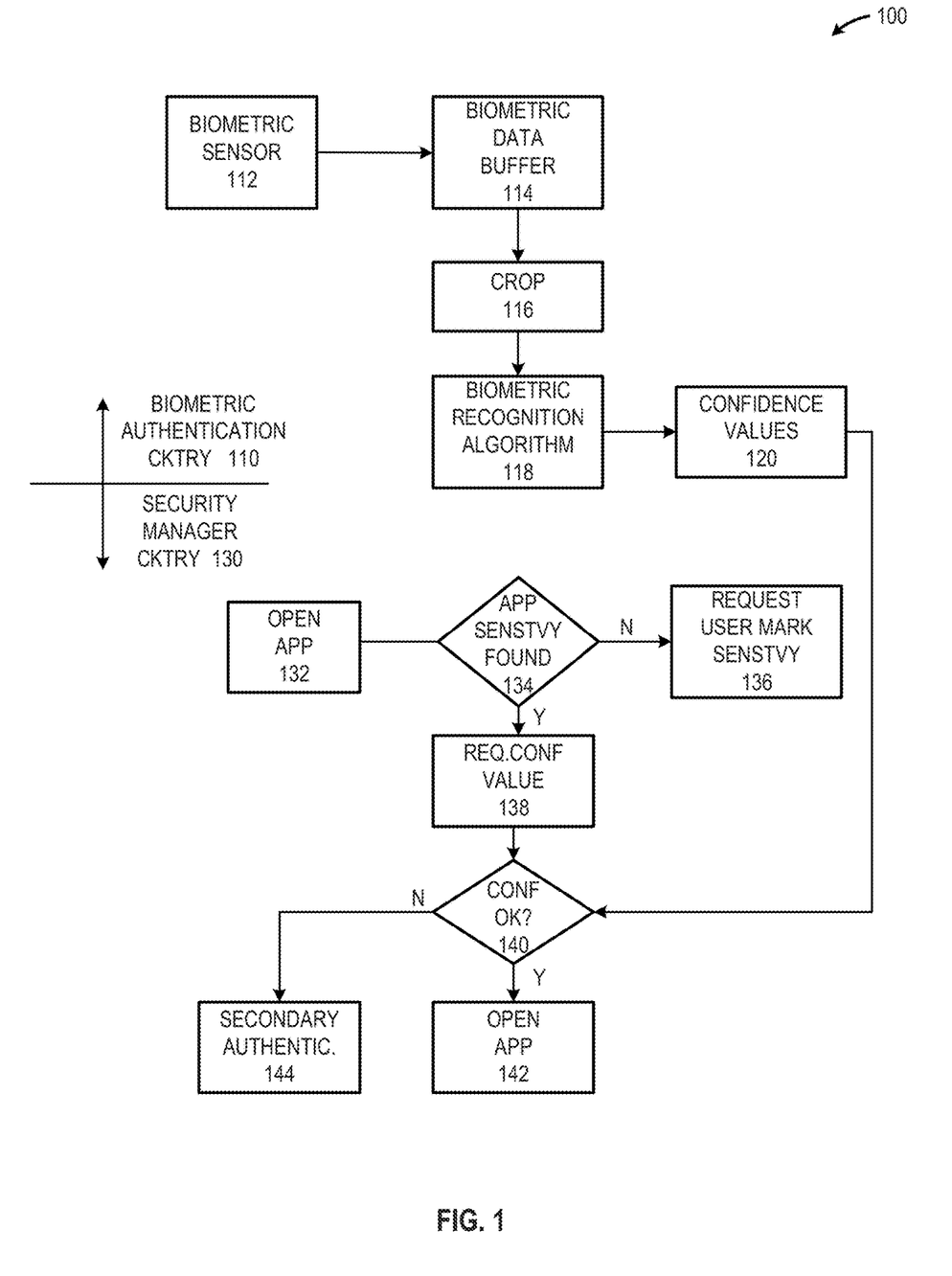
FIG. 1 is a block flow diagram depicting an illustrative biometric-based graded authentication method that includes biometric authentication circuitry and security manager circuitry, in accordance with at least one embodiment described herein.

FIG. 1 is a block flow diagram depicting an illustrative biometric-based graded authentication method 100 that includes biometric authentication circuitry 110 and security manager circuitry 130, in accordance with at least one embodiment described herein. In embodiments, processor circuitry local to or remote from the device may be used to implement all or a portion of the biometric authentication circuitry 110 and all or a portion of the security manager circuitry 130. As depicted in FIG. 1, a portable electronic device biometric authentication system may use the device's biometric sensor 112 (e.g., a front-facing camera 112) to acquire biometric data that includes facial data associated with the device user. The biometric authentication circuitry 110 then periodically, intermittently, or continuously searches for the biometric data included in the output produced by the biometric sensor 112 and periodically, intermittently, or continuously performs authentication using the acquired user biometric data to generate a plurality of confidence values based on a comparison of the acquired biometric data with stored biometric data associated with one or more authorized device users.

The device's security manager circuitry 130 then monitors the user's interaction with each application and compares the highest confidence value generated by the biometric authentication circuitry 110 with a minimum confidence value with the security level necessary for the user to access the given application. The method 100 provides graded authentication by varying the false acceptance rate (FAR) according to the respective application sensitivity level associated with each of a plurality of applications. In embodiments, the sensitivity level may be associated with an application by the user. In embodiments, the sensitivity level may be associated with an application by the application developer and/or device manufacturer. Applications associated with a high sensitivity level will have a lower false acceptance rate thereby providing better user validation, while applications associated with a lower sensitivity level will have higher false acceptance rate allowing for faster and lower level of user validation.

As depicted in FIG. 1, the biometric sensor 112 provides output that may contain biometric data to biometric data buffer circuitry 114. Biometric data cropping circuitry 116 then identifies each of a plurality of instances of user biometric data included in some or all or the biometric data stored in the biometric data buffer circuitry 114. A biometric recognition algorithm 118 executed by the biometric authentication circuitry 110 then compares each of the plurality of instances of user biometric data with authorized and/or authenticated user biometric data to generate a plurality of confidence values 120A-120n associated with the device user based on the biometric data acquired by the biometric sensor 112. Each of the plurality of confidence valves 120A-120n has an associated false acceptance rate value. In embodiments, although the same user biometric data may be included in some or all of the biometric data generated by the biometric sensor 112, the respective confidence value (and consequently, the false acceptance rate) generated by the biometric recognition algorithm 118 may vary based on ambient lighting, user pose, or other environmental factors. The generation of the plurality of confidence values 120A-120n occurs in the background and is typically unobservable and transparent to the device user.

In operation, the device user requests to open an application 132. In response, the security manager circuitry 130 determines at 134 whether an existing sensitivity value is associated with the application. If no sensitivity value is associated with the application, the security manager circuitry 130 requests at 136 that the user enter a sensitivity value associated with the application. If a sensitivity value has been previously associated with the application, the security manager circuitry 130 acquires the sensitivity value 138 and determines whether the false acceptance rate associated with the greatest of the plurality of confidence values 120A-120n is sufficient to access the requested application based on the sensitivity associated with the application. If the false acceptance rate is lower than a threshold false acceptance rate value for the sensitivity value associated with the requested application (i.e., the confidence value in identification of the device user is sufficiently high compared to the sensitivity associated with the requested application), the security manager circuitry 130 opens the application at 142. On the other hand, if the false acceptance rate is greater than a threshold false acceptance rate value for the sensitivity value associated with the requested application (i.e., the confidence value in identification of the device user is too low compared to the sensitivity associated with the requested application), the security manager circuitry 130 requests a secondary authentication of the device user 144.

The method 100 beneficially provides users with fast and unobtrusive access to applications on their portable electronic devices while protecting access to the application based on a passive user authentication system. The method 100 provides graded authentication by varying the false acceptance rate according to the application sensitivity level designated by one or more of: the device user, the application developer, and/or the device manufacturer. Applications associated with a higher sensitivity will have a lower false acceptance rate providing a relatively high confidence user validation, while applications associated with a lower sensitivity will have higher false acceptance rate allowing for faster access based on a relatively low confidence user validation.

The biometric authentication circuitry 110 in performs one or more biometric recognition algorithms 118 and generates the plurality of confidence values 120A-120n periodically, intermittently, or continuously from the time the user accesses the device until the false acceptance rate associated with the highest sensitivity level is achieved. At this point, the user can access any application on the device without interruptions. The biometric authentication circuitry 110 may capture or acquire biometric data using one or more biometric sensors 112.

Biometric data may be generated by the one or more biometric sensors at any desired rate. For example, the one or more biometric sensors 112 may include one or more image acquisition devices/cameras that acquires image data at a rate of about: 1 frame per second (fps); 3 fps; 5 fps; 7 fps; 10 fps; or 20 fps. In one illustrative example, the biometric authentication circuitry 110 may acquire image data at a rate of about 5 fps. In embodiments, the use of intermediate biometric data capture rates, beneficially balances the authentication processing overhead and biometric data collection rate in the event the user intentionally or unintentionally provides intermittent or incomplete biometric data. For example, in the event the user does not directly face a biometric sensor 112, such as a camera, the user's facial data may appear only periodically in the acquired biometric data.

Biometric data acquired by the one or more biometric sensors 112 may be stored in whole or in part in local or remote storage circuitry, such as biometric data buffer circuitry 114. In embodiments, the biometric data buffer circuitry 114 may include circular buffer circuitry 114. The crop circuitry 116 identifies biometric data included in some or all of the data collected by the one or more biometric sensors 112 and stored in the biometric data buffer circuitry 114. For example, the crop circuitry 116 may identify biometric data, such as facial image data, included in each of a plurality of images produced by a biometric sensor 112, such as a camera or similar image acquisition device. The crop circuitry 116 isolates the user's biometric data from superfluous background content. The biometric data is then forwarded to the biometric recognition algorithm 118. In at least some embodiments, the crop circuitry 116 may include face detection algorithms implement a Haar-Cascade face detection algorithm provided by Open Computer Vision Library (OpenCV), an open-source cross-platform library for implementing real-time computer vision. The cropped biometric data may be passed onto the biometric recognition algorithm 118.

In at least some embodiments, the biometric recognition algorithm 118 may implement a Local Binary Patterns Histogram (LBPH) algorithm for face recognition, however the method 100 is not limited to the LBPH algorithm for biometric recognition. In embodiments, the biometric recognition algorithm 118 may use data associated with the biometric data included in the cropped biometric data to determine the likelihood that captured biometric data belong to an authorized user of the device. In at least some embodiments, the biometric recognition algorithm 118 may make such a determination by comparing a histogram of the captured biometric data with one or more histograms generated by a pre-trained biometric model of one or more authorized and/or authenticated users of the device. In at least some embodiments, the biometric recognition algorithm 118 may calculate a chi-square distance between the sample histogram and histograms in the model (a histogram corresponding to each image in the model), this distance provides the confidence value 120 (and consequently the false acceptance rate) associated with the respective facial data. This resulting confidence value indicates how closely the captured biometric data matches the pre-trained biometric data model. The lower the confidence value 120, the greater the correlation (i.e., the lower the deviation) between the acquired biometric data and stored biometric data associated with one or more authorized and/or authenticated users of the device. The stored biometric data associated with an authorized and/or authenticated user of the device may be generated upon first invocation of the method 100, and the authorized and/or authenticated user may be asked to provide a biometric data sample. For example, the authorized user of the device may be requested to provide one or more facial scans using a biometric sensor 112 such as a camera. In such implementations, the authorized user may be requested to face the camera 112 under good lighting conditions to capture the biometric facial data that is subsequently cropped and used by the biometric recognition algorithm 118 to generate confidence values 120 associated with future users of the device. In such implementations, the authorized user of the device may be requested to provide alternate or differing biometric data, for example by providing biometric facial data using different camera angles to the biometric recognition algorithm biometric recognition algorithm 118. In addition, the authorized user may provide biometric data to the biometric authentication circuitry by holding the device in the position in which they typically interact with the device.

The security manager circuitry 130 grants access to applications to the device user based on the confidence values 120A-120$n$ generated by the biometric recognition algorithm 118. The confidence value 120 generated by the biometric recognition algorithm 118 is indicative of how closely the biometric data includes in the biometric data provided by the one or more biometric sensors 112 matches the stored biometric data of one or more authorized device users. In at least some embodiments, the confidence values 120A-120$n$ may each be mapped to one of a plurality of application sensitivity levels. For example, a high sensitivity level may correspond to confidence values less than or equal to a first, relatively low, confidence value; a low sensitivity level may correspond to confidence values greater than or equal to a second, relatively high, confidence value; and an intermediate or medium sensitivity level may correspond to confidence values between the first confidence value and the second confidence value.

The method 100 makes use of two widely used metrics in face recognition, false rejection rate (FRR) and false acceptance rate (FAR). For a given confidence value, FAR indicates the number of cases when the model falsely accepts an impostor image, while FRR indicates the number of instances when a true user is rejected by the model. Both FAR and FRR values are related to the corresponding confidence value. Choosing a low confidence value would decrease FAR, thus making the system more secure. However, a lower confidence value also means less tolerance to changes in lighting and facial features, and it can lead to an increase in FRR, thus making the model too conservative.

The method 100 will now be described in terms of biometric data in the form of facial scan data obtained using one or more biometric sensors 112, such as a camera 112. The method 100 commences as soon as the user activates the portable electronic device. As the biometric authentication circuitry 110 performs the image acquisition steps in the background, the method 100 generates the plurality of confidence values 120A-120$n$. When the device user attempts to access an application the security manager circuitry 130 searches for the sensitivity associated with the requested application in a local or remote database, data store, or data structure. If the security manager circuitry 130 fails to return a sensitivity level associated with the requested application (e.g., in the event the user has opened the requested application for the first time), the security manager circuitry 130 asks the user to associate a sensitivity level (e.g., high, moderate, or low) with the requested application. The security manager circuitry 130 then selects or determines the required confidence value at 138 for the respective application based on the sensitivity associated with the application. If this confidence value is equal to or greater than the confidence value returned by the biometric authentication circuitry 110, the user is granted access to the application otherwise the user is requested at 144 to authenticate either by better face position or through a secondary authentication method such as passcode. In embodiments, the biometric identification circuitry 110 may include machine learning and/or neural network circuitry to alter and/or adjust confidence values associated with an authorized device user based on facial data collected by the camera 112 and associated with the authorized user.

In at least some embodiments, the processor circuitry may execute the method 100 continuously until the confidence level associated with the highest application sensitivity is reached. In embodiments, the method 100 may include one or more terminating conditions. In at least some embodiments, the method 100 may be terminated when a confidence value of 50 or lower is obtained, since a confidence value of 50 indicates that the current device user can be granted access to applications with the highest sensitivity. In other embodiments, the biometric authentication circuitry 110 may terminate the method 100 when a user requests an application which requires a lower confidence value (higher sensitivity) than the biometric authentication circuitry 110 is able to validate. In such embodiments, the biometric authentication circuitry 110 may prompt the device user to reposition the device with respect to their face or illumination, or the security monitor circuitry 130 may require a secondary authentication 144, resulting in the highest sensitivity level. In yet other embodiments, a scenario a scenario may arise where neither the first nor second conditions are met. For example, when a user attempts to interact under poor conditions with an application associated with a low sensitivity, the biometric authentication circuitry 110 may attempt to perform biometric recognition for the pendency of the user's interaction with the device, degrading the battery life. In such embodiments, the method 100 may include a timeout period to after which the biometric recognition process is paused, stopped, or abandoned and secondary authorization methods are substituted. In embodiments, the timeout period may be selected based on the distribution of application start times. For example, in embodiments an 80% chance may exist that users will start high or moderate sensitivity applications before 30 seconds from the time the device is activated. In such an embodiment, a 30-second timeout would thus be appropriate.

Figure 2:
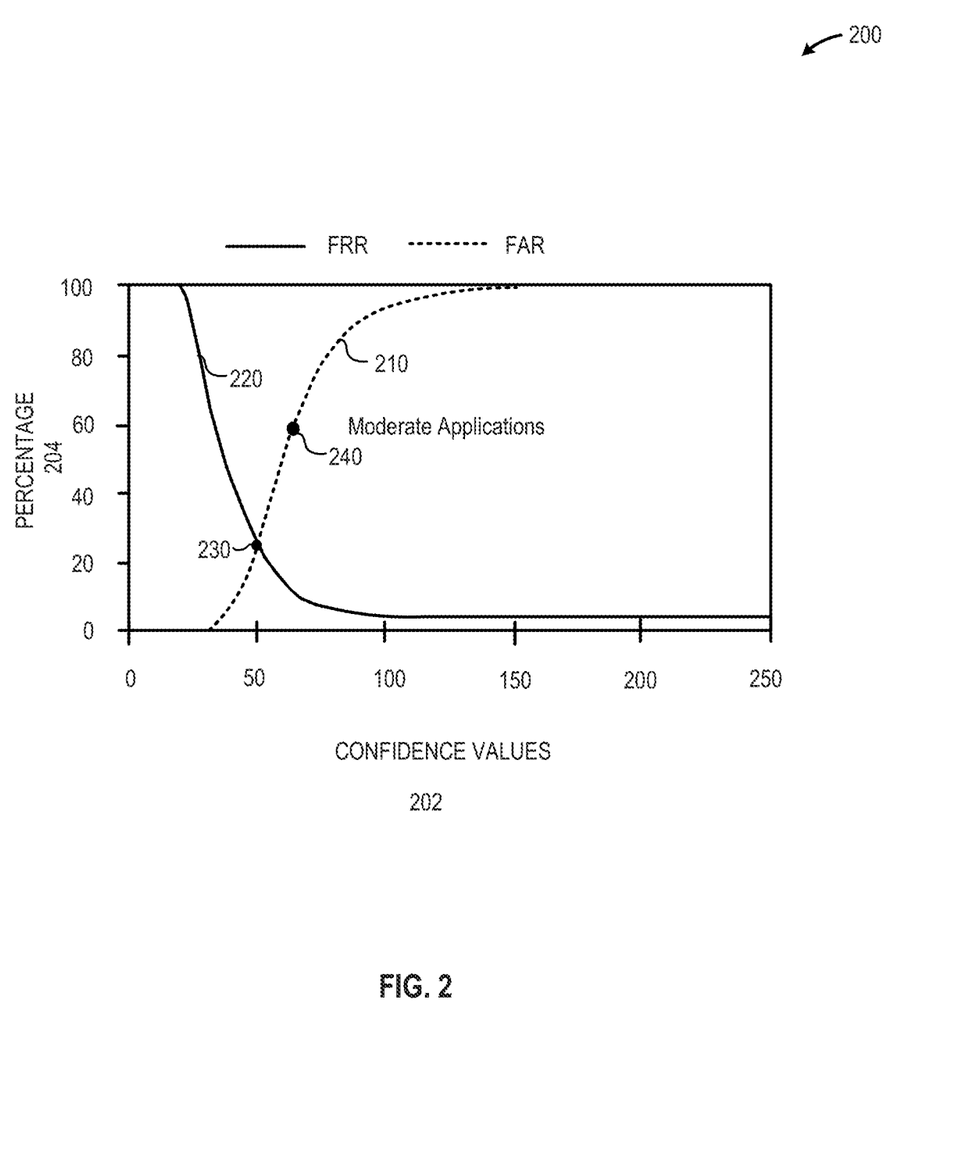
FIG. 2 is a graph that depicts an illustrative false acceptance rate (FAR) curve and an illustrative false rejection rate (FRR) curve plotted with respect to confidence values, in accordance with at least one embodiment described herein.

FIG. 2 is a graph 200 that depicts an illustrative false acceptance rate (FAR) curve 210 and an illustrative false rejection rate (FRR) curve 220 plotted with respect to confidence values 202, in accordance with at least one embodiment described herein. Under ideal circumstances, applications associated with high sensitivity would block any access attempts by unauthorized users, in other words we would choose a confidence value for critical applications where FAR=0. Such a case however, this would make the model too conservative and would reject all true images, as seen in FIG. 2. Thus, in at least some embodiments, the first, relatively low, confidence threshold value 230 applications associated with a high sensitivity to a value where FAR=FRR, as depicted in FIG. 2. Using graph 200, this would provide a false acceptance rate value of 25% and a corresponding confidence value of 50. The second, relatively high, confidence threshold value 240 distinguishes between those applications associated with a medium sensitivity value and those applications associated with a low sensitivity value. The second, relatively high, confidence threshold value 240 may be based, in at least some embodiments, on user preference. While some users might perceive the sensitivity of moderate applications to be closer to high applications, others might be content with much looser security guarantees, allowing them to gain quicker access to the applications. Thus, in the embodiment depicted in FIG. 2, the second confidence threshold value 240 may range from 50 to 150 where 150 offers the least security with 100% FAR. In the example depicted in FIG. 2, the second confidence threshold value 240 may be set at the midpoint between 25% and 100% false acceptance rate, in other words, a confidence value corresponding to 62% false acceptance rate. The corresponding confidence value of 66 will; therefore, give equal importance to both user preferences. In some embodiments, low sensitivity applications often consist of applications which require no security to unlock, for instance clock, weather, news, etc. For such applications associated with low sensitivity, the confidence value is essentially any value greater than the defined second confidence threshold value 240, thereby permitting any user access to the application.

The method 100 beneficially adapts to changing user and/or ambient lighting conditions or face position angles with respect to the camera 112. Such adaptability assists in providing a robust system that will minimize the reliance on secondary authentication. In embodiments, the method 100 may be enhanced via dynamic retraining to update an authorized user's trained facial data to improve confidence values 120 in varied lighting conditions or in a variety of device positions and/or locations. Such dynamic retraining occurs when the security fails to provide authentication as described in the second termination case above. Once users authenticate themselves using the alternate method, the images captured just before the secondary authentication method may be used to update the stored user facial data. However, not all lighting conditions may provide beneficial retraining and the method 100 only performs retraining if the Haars-Cascade method detects facial data in the plurality of image stored in the image buffer circuitry 114. Since the LBPH maintains facial data histograms corresponding to the images inside the model, adding another model image appends a new facial histogram to the existing stored histogram data, a fast and efficient operation that does not require the complete rebuilding of the model. There may be scenarios where an authorized user unlocks the device using secondary authentication, and then passes the device to another, potentially unauthorized, user. In such instances, the method 100 may attempt to retrain using facial histogram data obtained from the current, unauthorized, user of the device. In order to prevent such erroneous retraining of the face recognition circuitry 118, the facial authentication circuitry 110 may include an empirically defined retraining threshold. In embodiments, the retraining threshold may be determined by running user models against true user sample images and then against advisory images (where the face does not match) followed by clustering the resultant confidence values 120. In such instances, the face recognition circuitry 118 confidence values 120 may range from about 110 to about 171. On the other hand when the model was presented with the authorized user's facial data, the face recognition circuitry 118 confidence values 120 were lower, from about 38 to about 47. In such instances, the lower face recognition circuitry 118 confidence values 120 may be used to establish the retraining threshold.

The addition of facial histogram data may cause an unwanted or undesirable increase in memory allocated to storage of the facial histograms. To limit the impact of such facial histogram data, the model size may be limited to a fixed memory allocation, such as 16 MB. Additionally, a least recently used (LRU) eviction policy may be applied to evict the least frequently used facial histogram data from the memory allocated to facial histogram storage. In such embodiments, the LRU eviction may be implemented by associating a timestamp with each facial histogram in the model. Whenever face recognition circuitry 118 returns a confidence value 120, it also outputs the facial histogram the face recognition circuitry identified as the closest match to the acquired facial image and associated a current timestamp with the facial histogram. The face recognition circuitry 118 evicts the facial histogram associated with the oldest timestamp once the memory limit is reached.

In embodiments, either or both the facial authentication circuitry 110 and/or the security manager circuitry 130 may be provided by the device processor circuitry. For example the device CPU, GPU, or similar single- or multi-core processor may be used to implement all or a portion of either or both the facial authentication circuitry 110 and/or the security manager circuitry 130. In embodiments, the camera 112 may obtain image data at 480p resolution as a background function. To detect when an application comes to the foreground, we make use of Android accessibility features. Upon receipt of an application request from the device user, the security manager circuitry 130 may determine whether the application has a previously associated sensitivity level. Responsive to a determination that the application does not have a previously associated sensitivity level, the security manager circuitry 130 then requests the device user to enter a sensitivity level for association with the respective application.

If on the other hand, the security manager circuitry 130 determines that a previously assigned sensitivity level has been associated with the requested application, the security manager circuitry 130 permits access if the false access rate value associated with the facial histogram is less than a defined threshold confidence value 120 associated with the application's associated sensitivity level.

Figure 3A:
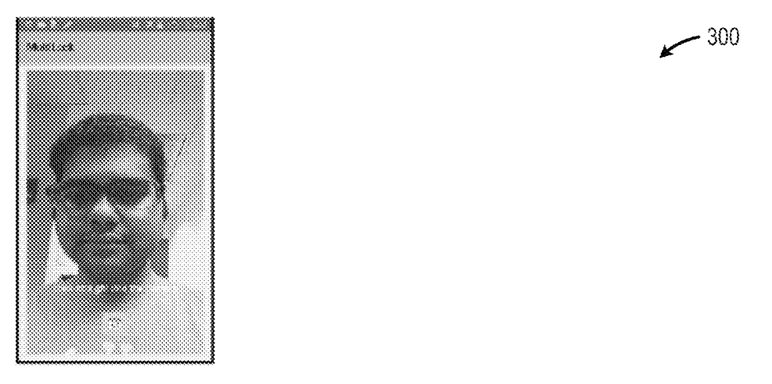
FIG. 3A depicts an illustrative authorized user image capture in response to the biometric-based graded authentication system instructing the user of the device to look straight into the camera, in accordance with at least one embodiment described herein.
Figure 3B:
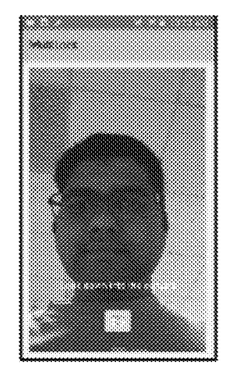
FIG. 3B depicts another illustrative authorized user image capture in response to the biometric-based graded authentication system instructing the user to look downward into the camera to acquire a second authorized user image. In accordance with at least one embodiment described herein.
Figure 3C:
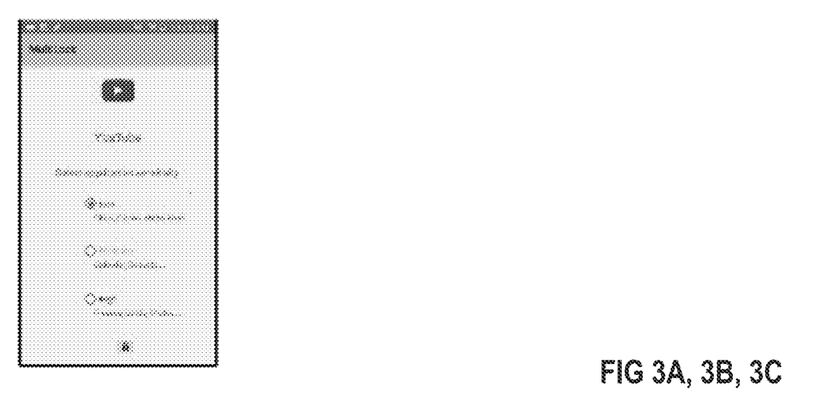
FIG. 3C depicts an illustrative interface when the user requests access to an application that does not have an associated sensitivity level, in accordance with at least one embodiment described herein.

FIGS. 3A, 3B, and 3C include illustrative screenshots of the method 100 executed by a portable electronic device such as an Android® smartphone, in accordance with at least one embodiment described herein. FIGS. 3A and 3B depict the acquisition of illustrative authorized user facial images for use with the biometric-based graded authentication method 100. In FIG. 3A, the biometric-based graded authentication method 100 instructs the user of the device to look straight into the camera 112 to acquire a first authorized user image used to generate a first authorized user facial histogram. In FIG. 3B, the biometric-based graded authentication method 100 instructs the user of the device to look downward into the camera 112 to acquire a second authorized user image used to generate a second authorized user facial histogram. FIG. 3C depicts an illustrative interface when the user requests access to an application that does not have an associated sensitivity level. In the example embodiment depicted in FIG. 3C, in addition to providing the 3 sensitivity level options of low, moderate and high, the biometric-based graded authentication method 100 also may provide a footnote describing example type of applications for each of the sensitivity levels. In embodiments, as the biometric-based graded authentication method 100 remains active in the background, a small camera-shaped icon may be displayed on the screen of the portable electronic device.

In embodiments described herein, a threat model may be used to analyze the security of the biometric-based graded authentication method 100. The threat model may enable identification and quantification of security risks, and also may enable resolution of the security risks associated with the biometric-based graded authentication method 100. In one example embodiment, the threat model may divided into three sections: 1) External Entities, 2) Stride Thread List, and 3) Countermeasures List.

For example, all components which are external to the code/implementation of the biometric-based graded authentication method 100 (and thus, may pose a threat to the biometric-based graded authentication method 100) are referred to as an "external entities." These external entities are not fully under the control of the biometric-based graded authentication method 100, and may include, for example, the user currently interacting with the portable electronic device, the OpenCV Haar cascades used for face detection, the Haar descriptions that may be read from an XML file, nn training, the user facial histogram may be stored in a private file, the application-specific sensitivity levels of the user may be loaded from an application-specific private database, a database that stores the security levels designated by the user for each application on the device.

Threats to the biometric-based graded authentication method 100 may be categorized using STRIDE—Spoofing, Tampering, Repudiation, Information Disclosure, Denial of Service, Elevation of Privilege. In embodiments, a set of security controls may prevent these threats from harming the system.

Type: Spoofing
Description: An attacker could try to tamper with the trained user model file or the Haar cascade. This could result in false positives as well as false negatives.
Security Control: Authentication.
Countermeasures: Store trained model file and Haar-Cascade in application-specific private storage.

Type: Elevation of Privileges
Description: An attacker could change the sensitivity level associated with different applications. The attacker could lower the security level of a sensitive application and try to obtain access using a reduced sensitivity level.
Security Control: Authorization.
Countermeasures: Store the security levels in a secure storage location within the portable electronic device. For example, in an Android application Sqlite database. Android ensures that this database content can only be accessed by the same application that created it. Thus preventing unauthorized access from other applications.

Figure 4:
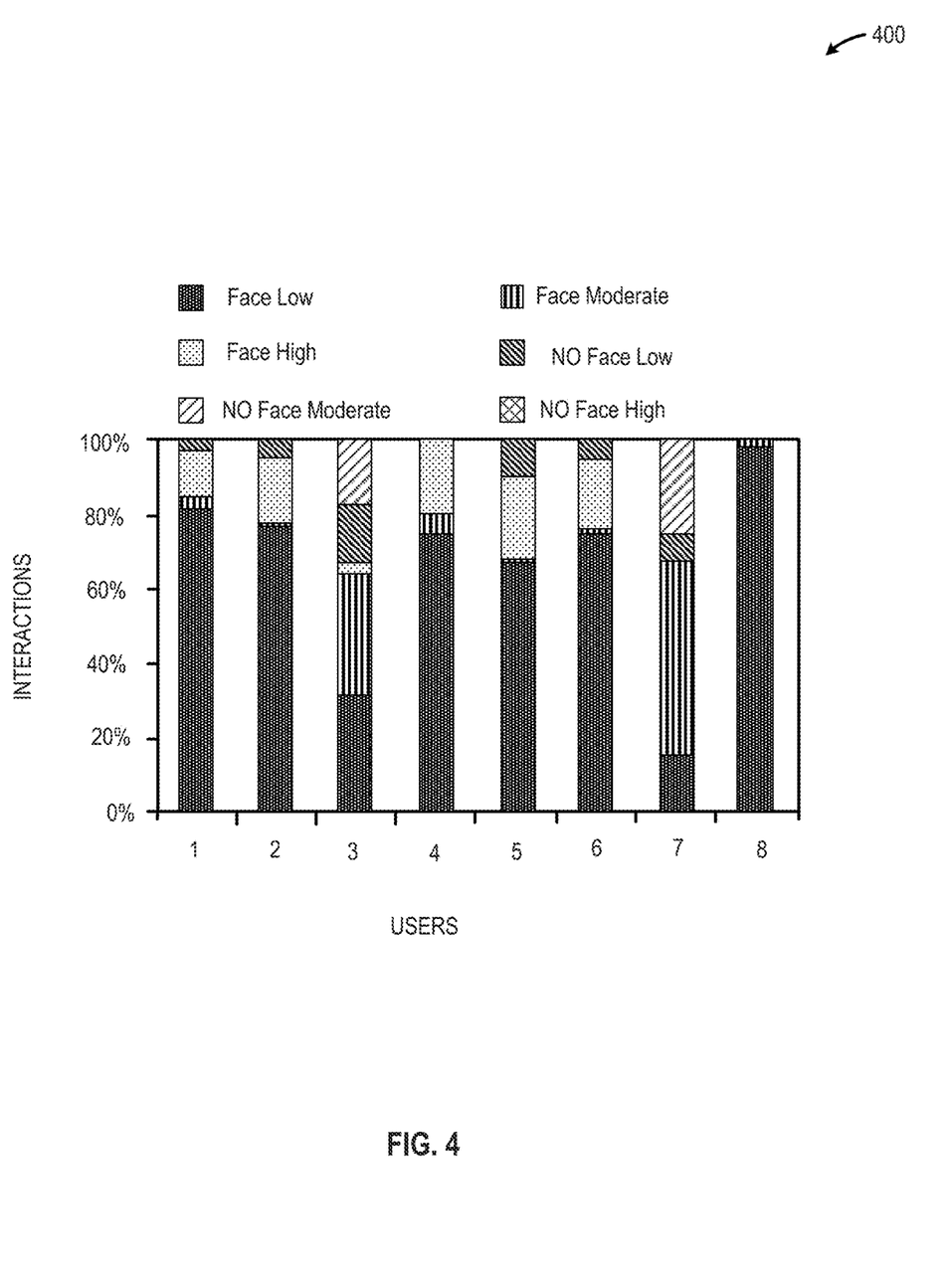
FIG. 4 is a graph depicting illustrative interaction traces depicting the sensitivity level of applications accessed by eight (8) users over a 48-hour period and whether the application was unlocked using facial authentication or secondary authentication, in accordance with at least one embodiment described herein.

FIG. 4 is a graph 400 depicting illustrative interaction traces depicting the sensitivity level of applications accessed by eight (8) users over a 48-hour period and whether the application was unlocked using facial authentication or secondary authentication, in accordance with at least one embodiment described herein. Each user installed an application that recorded the user's face using the front-facing camera of the device when they interacted with their device. The applications accessed by the users during each session were logged. Both the recording and the access logging were initiated after the users activated their device and were augmented with timestamps to match interactions videos to exact application openings. This setup permitted the collection of real-life interaction traces from users throughout the day, providing a realistic set of traces to validate the biometric-based graded authentication method 100. Finally, we provided each user with their respective list of applications, and asked them to categorize each of the applications as one of: a high sensitivity application; an intermediate sensitivity application; or a low sensitivity application.

Since the biometric-based graded authentication method 100 provides access to applications dependent upon the camera capturing images of the device user's face while interacting with the device, each trace was apportions into 2 categories—those which contained a face, and those which did not. A trace is deemed to not contain a face if the Haar-Cascade algorithm executed by the facial authentication circuitry 110 fails to find facial data in the interaction session. In embodiments, one reason for the absence of facial data in a trace was device usage in complete darkness, for example in a dark room or outdoors at night. As depicted in FIG. 4, across many user interactions (except user 3 and 7), facial data is quite often present (e.g., on average, about 95% of the time). In addition, FIG. 4 also indicates that sessions which do not include facial data typically include a significant number of accesses to applications associated with a low sensitivity. Since the biometric-based graded authentication method 100 does not require low sensitivity applications to pass through the face authentication phase, users would be able to easily open these without having to fall back upon time-consuming secondary authentication methods. For example, as depicted in FIG. 4, while user 3 has relatively fewer interaction sessions with a face, 65% when compared to 95% on average for other users, 14% of their non-face sessions invoked only low sensitivity applications.

From FIG. 4, using a traditional face authentication system, user 3 and user 7 would use secondary authentication to access applications about one-third of the time, i.e., about 31% to 33% of the time. Using the biometric-based graded authentication method 100, on the other hand, would reduce the secondary authorization by user 3 and user 7 to one-quarter or less of the time, i.e., 17% to 24% of the time, due to the graded sensitivity levels of the accessed applications. Thus, the information presented in FIG. 4 demonstrates the usefulness of the biometric-based graded authentication method 100 even in scenarios with adverse lighting condition as seen in the case of user 3 and 7.

Figure 5:
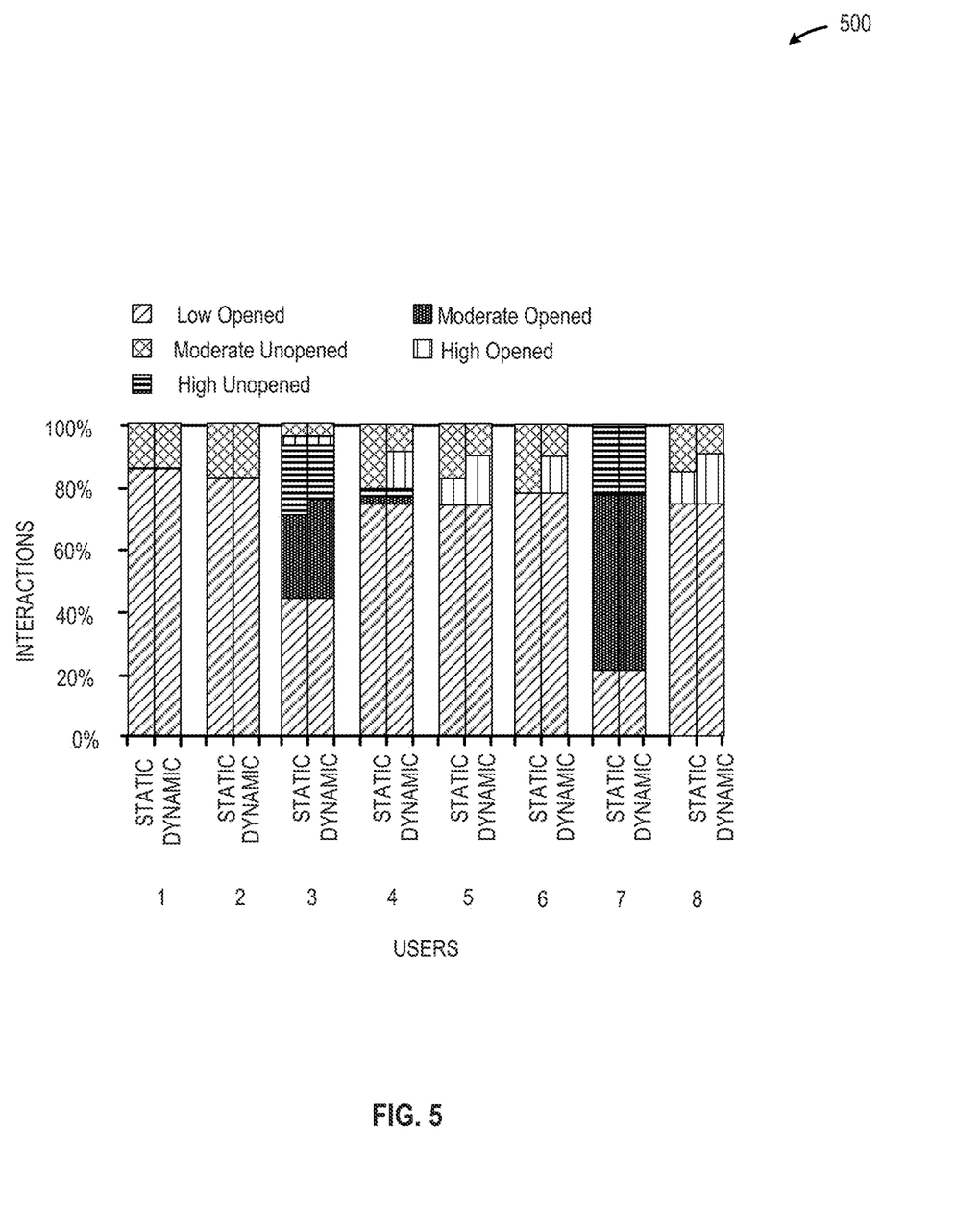
FIG. 5 is a graph depicting an illustrative distribution of interactions for each user that the biometric-based graded authentication method 100 was able to provide access to an applications, as well as interactions in which the biometric-based graded authentication method used secondary authentication to provide access to applications when the biometric-based graded authentication method was placed in a STATIC (i.e., no dynamic retaining) mode and DYNAMIC (i.e., with retraining) mode, in accordance with at least one embodiment described herein.

FIG. 5 is a graph 500 depicting an illustrative distribution of interactions for each user that the biometric-based graded authentication method 100 was able to provide access to an applications, as well as interactions in which the biometric-based graded authentication method 100 used secondary authentication to provide access to applications when the biometric-based graded authentication method 100 was placed in a STATIC (i.e., no dynamic retaining) mode and DYNAMIC (i.e., with retraining) mode, in accordance with at least one embodiment described herein. As depicted in graph 500, in a STATIC operating mode, the biometric-based graded authentication method 100 provided access to a high percentage of user access requests (approx. 81%) without use of secondary authentication. Using the data in FIG. 5, on average about 2.8% and about 11.5% of the access request correspond to applications associated with high and moderate sensitivity, respectively, while the remaining 66.7% of access requests correspond to applications associated with a low sensitivity. Drawing attention to user #7, a large number of access requests were directed to applications associated with a moderate sensitivity level. For user #7, about 79% of the access requests where for applications associated with moderate sensitivity, and the biometric-based graded authentication method 100 provided access in about 58% of those requests without using secondary authentication.

As depicted in FIG. 5, additional improvements may occur when the biometric-based graded authentication method 100 is placed in a DYNAMIC operating mode in which dynamic retraining occurs. As in the DYNAMIC operating mode, the biometric-based graded authentication method 100 updates the facial histogram in response to a user having to use a secondary authentication to access an application, providing improved performance in various adverse lighting conditions. This improvement is most notable for applications associated with a high sensitivity level. In the embodiment illustrated in FIG. 5, when in the STATIC operating mode, the biometric-based graded authentication method 100 provided access to about 18.1% of requests to access applications associated with a high sensitivity level, in contrast, when in the DYNAMIC operating mode, the biometric-based graded authentication method 100 provided access to about 47.5% of requests to access applications associated with a high sensitivity level. This improvement is most notably seen in user 4, who had a large number interactions both indoors and outdoors, thus giving rise to some rather unique lighting conditions. In this case, when in the DYNAMIC operating mode, the biometric-based graded authentication method 100 provided access to 2.6 times more high sensitivity applications automatically, when compared to the STATIC operating mode.

Figure 6:
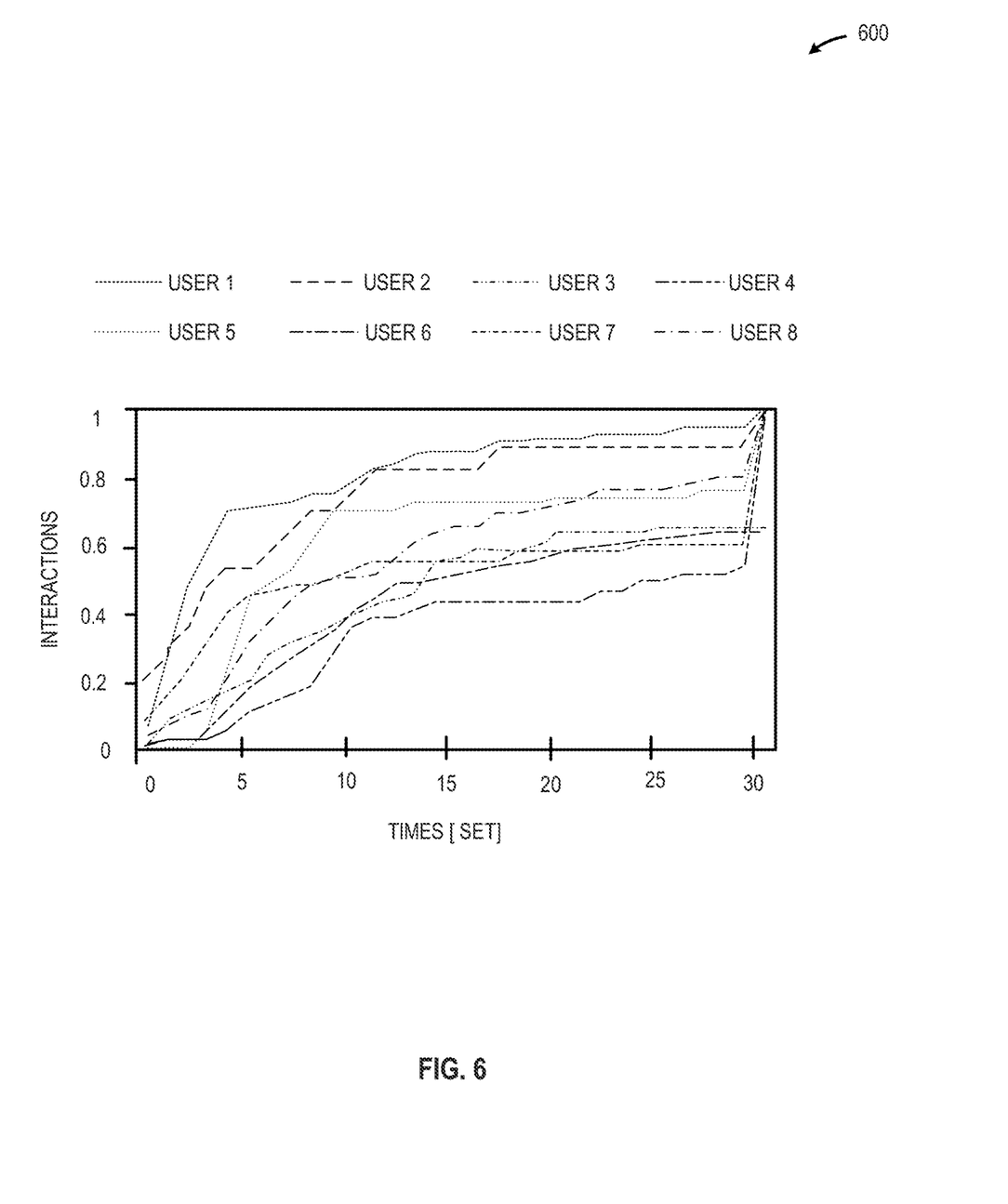
FIG. 6 is a graph depicting the background execution time of the biometric-based graded authentication method while in the DYNAMIC operating mode, in accordance with at least one embodiment described herein.

FIG. 6 is a graph 600 depicting the background execution time of the biometric-based graded authentication method 100 while in the DYNAMIC operating mode, in accordance with at least one embodiment described herein. The biometric-based graded authentication method 100 runs as a background process while users interact with their device. In embodiments, the duration that the biometric-based graded authentication method 100 executes in the background may be minimized to reduce any potential impact on battery life and performance. In the example embodiment depicted in FIG. 6, the runtime of the biometric-based graded authentication method 100 may be capped by a timeout period of 30 seconds. While the runtime of the biometric-based graded authentication method 100 may be affected by several factors such as lighting conditions, types and time of applications that users interacted with, 50% of interactions across all users required the algorithm to run an average of only 8.2 seconds. FIG. 6 further demonstrates that for both user 1 and 3, 80% of their interactions required the biometric-based graded authentication method 100 to run for 11 seconds or less. In case of user 1, the interactions were relatively short, accessing the device to access applications associated with low sensitivity levels followed by promptly turning off the display. As for user 3, most of the interactions were for moderate sensitivity and the biometric-based graded authentication method 100 established a confidence threshold well below the threshold for high sensitivity applications (one of the termination conditions). In case of the remaining users, the biometric-based graded authentication method 100 ran longer in the background, due to poor lighting conditions when users interacted with low sensitivity applications.

Many users have stated it would be inconvenient to use different biometric methods to protect different resources. The biometric-based graded authentication method 100 however, uses only facial recognition to achieve graded security, beneficially minimizing user inconvenience. The biometric-based graded authentication method 100 is agnostic to the underlying face recognition algorithm executed by the face recognition circuitry 118. Although the Local Binary Pattern Histogram (LBPH) may be used in some implementations, the biometric-based graded authentication method 100 is designed to run on portable electronic devices. In other embodiments, the face recognition circuitry 118 may implement an algorithm similar to the LBPH, such as Active Appearance Model (AAM). The Active Appearance Model (AAM) employs an integrated statistical model which combines a model of shape variation with a model of the appearance variations in a shape-normalized frame. An AAM contains a statistical model if the shape and gray-level appearance of the object of interest which can generalize to almost any valid example. Matching to an image involves finding model parameters which minimize the difference between the image and a synthesized model example projected into the image. However, this method is more computationally expensive than LBPH for cellular devices.

In embodiments, other popular face recognition algorithms may be implemented by the face recognition circuitry 118, such face recognition algorithms include, but are not limited to, the Eigenfaces method and the Fischerfaces method. The Eigenfaces method uses Principal Component Analysis (PCA) to reduce the high dimensional image into lower dimensions along which there is maximum variance. The Eigenfaces method does not take class labels into account, and hence if variance is generated from an external source, the axes with maximum variance need not necessarily contain any discriminative information, and classification becomes impossible. The Fischerfaces method takes class labels into account as well and identifies the lower subspace with maximum variance across each class.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "system" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more non-transitory storage mediums having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for graded-security systems and methods that provide access to portable electronic devices using a passive facial recognition and graded application security system that is executed as a background operation on portable electronic devices.

According to example 1, there is provided a graded-security system for providing access to portable electronic device applications. The system may include: biometric authentication circuitry to: execute one or more biometric identification algorithms as a passive background process; and generate a plurality of confidence values for a device user, each of the plurality of confidence values associated with device user biometric data included in a respective ones of a plurality of device user biometric inputs; and security manager circuitry to: determine a sensitivity level associated with a requested application responsive to receipt of a user input to access the requested application; and compare the determined sensitivity level associated the requested application with a false access rate corresponding to the lowest confidence value included in the plurality of confidence values.

Example 2 may include elements of example 1 and the system may further include: machine learning circuitry to adjust confidence values associated with an authorized device user based on biometric data associated with the authorized user.

Example 3 may include elements of any of examples 1 or 2 where the plurality of device user biometric inputs are obtained via a background process by one or more device user biometric input devices and where the biometric authentication circuitry includes buffer circuitry to store device user biometric data for each of the plurality of device user biometric inputs.

Example 4 may include elements of any of examples 1 through 3 where the device user biometric input devices includes one or more image acquisition devices; where the device user biometric input includes facial image data; and where the one or more biometric identification algorithms includes a facial recognition algorithm.

Example 5 may include elements of any of examples 1 through 4 where the biometric authentication circuitry further includes face cropping circuitry to crop facial image data representative of a face of the device user from each of at least some of a plurality of images received from one or more image acquisition devices.

Example 6 may include elements of any of examples 1 through 5 and the security manager circuitry may further cause the requested application to launch responsive to the false access rate corresponding to the lowest confidence value included in the plurality of confidence values is less than a false acceptance rate threshold value associated with the determined sensitivity level.

According to example 7, there is provided a graded-security method for providing access to portable electronic device applications. The method may include: executing, by biometric authentication circuitry, one or more biometric identification algorithms as a passive background process; acquiring, via one or more device user biometric input devices, a plurality of biometric inputs, wherein each of the biometric inputs includes biometric data associated with a user of the device; generating, by the biometric authentication circuitry, a plurality of confidence values, each of the plurality of confidence values associated with a respective one of the plurality of biometric inputs that includes the biometric data associated with the user of the device; determining, by security manager circuitry, a sensitivity level associated with a requested application responsive to receipt of a user input to access the requested application; and comparing, by the security manager circuitry, the sensitivity level associated the requested application with a false access rate corresponding to the lowest confidence value included in the plurality of confidence values.

Example 8 may include elements of example 7, and the method may further include: adjusting, by machine learning circuitry, at least one of the confidence values associated with an authorized device user based on biometric data associated with the authorized user.

Example 9 may include elements of any of examples 7 or 8 where acquiring a plurality of biometric inputs further comprises acquiring, via one or more device user biometric input devices, a plurality of device user biometric inputs obtained via a background process by one or more device user biometric input devices.

Example 10 may include elements of any of examples 7 through 9, and the method may further include storing at least a portion of the device user biometric data in buffer circuitry communicatively coupled to the biometric authentication circuitry.

Example 11 may include elements of any of examples 7 through 10 where acquiring a plurality of biometric inputs further includes: acquiring, via one or more image acquisition devices, a plurality of images, where each of at least a portion of the plurality of images includes facial image data; and where the one or more biometric identification algorithms includes a facial recognition algorithm.

Example 12 may include elements of any of examples 7 through 11 and the method may further include: cropping, by the biometric authentication circuitry, the facial data from at least a portion of the plurality of acquired images prior to the generation of the plurality of confidence values.

Example 13 may include elements of any of examples 7 through 12 where acquiring the plurality of biometric inputs, further comprises: acquiring, via the one or more image acquisition devices, a plurality of images as a passive background process at a frame rate of 5 frames per second or less.

Example 14 may include elements of any of examples 7 through 13, and the method may further include: causing the requested application to launch responsive to the false access rate corresponding to the lowest confidence value included in the plurality of confidence values is less than a false acceptance rate threshold value associated with the determined sensitivity level.

According to example 15, there is provided a non-transitory machine-readable storage medium that includes instructions that, when executed by processor circuitry included in a portable electronic device, cause the processor circuitry to: cause biometric authentication circuitry to execute one or more biometric identification algorithms as a passive background process; acquire, via one or more device user biometric input devices, a plurality of biometric inputs, wherein each of the plurality of biometric inputs includes biometric data associated with a user of the device; generate, by the biometric authentication circuitry, a plurality of confidence values, each of the plurality of confidence values associated with a respective one of the plurality of biometric inputs that includes the biometric data associated with the user of the device; wherein each of the plurality of confidence values includes data indicative of a reliability of an identification of the user of the device; cause the security manager circuitry to determine a sensitivity level associated with a requested application responsive to receipt of a user input to access the requested application; and cause the security manager circuitry to compare the sensitivity level associated with a false access rate associated with the lowest confidence value included in the plurality of confidence values.

Example 16 may include elements of example 15 where the instructions further cause the processor circuitry to: cause machine learning circuitry to adjust at least one of the confidence values associated with an authorized device user using biometric data associated with the authorized user of the device.

Example 17 may include elements of any of examples 15 or 16 where the instructions that cause the processor circuitry to acquire the plurality of biometric inputs from the device user, may further cause the processor circuitry to: acquire, via the one or more device user biometric input devices, a plurality of biometric inputs associated with the device user via a passive background process.

Example 18 may include elements of any of examples 15 through 17 where the instructions further cause the processor circuitry to: store at least a portion of the device user biometric data in buffer circuitry communicatively coupled to the biometric authentication circuitry.

Example 19 may include elements of any of examples 15 through 18 where the instructions that cause the processor to acquire a plurality of biometric inputs may further cause the processor circuitry to acquire via one or more image acquisition devices, a plurality of images; where each of at least a portion of the plurality of images includes device user biometric data that includes facial image data; and where the one or more biometric identification algorithms includes a facial recognition algorithm.

Example 20 may include elements of any of examples 15 through 19 where the instructions may further cause the processor circuitry to: cause the biometric authentication circuitry to crop the facial data from at least a portion of the plurality of acquired images prior to the generation of the plurality of confidence values.

Example 21 may include elements of any of examples 15 through 20 where the instructions that cause the processor circuitry to acquire the plurality of biometric inputs, further cause the processor circuitry to: cause the one or more image acquisition devices to acquire the plurality of images as a passive background process at a frame rate of 5 frames per second or less.

Example 22 may include elements of any of examples 15 through 21 where the instructions further cause the processor circuitry to: cause the requested application to launch responsive to the false access rate corresponding to the lowest confidence value included in the plurality of confidence values is less than a false acceptance rate threshold value associated with the determined sensitivity level.

According to example 23, there is provided a portable electronic device. The portable electronic device may include: an image acquisition device; a display device; data storage circuitry; and processor circuitry that includes biometric authentication circuitry and security manager circuitry; biometric authentication circuitry to: execute one or more biometric identification algorithms as a passive background process; and generate a plurality of confidence values for a device user, each of the plurality of confidence values associated with device user biometric data included in a respective ones of a plurality of device user biometric inputs; and security manager circuitry to: determine a sensitivity level associated with a requested application responsive to receipt of a user input to access the requested application; and compare the determined sensitivity level associated the requested application with a false access rate corresponding to the lowest confidence value included in the plurality of confidence values.

Example 24 may include elements of example 23 and the device may further include: machine learning circuitry to adjust confidence values associated with an authorized device user based on biometric data associated with the authorized user.

Example 25 may include elements of any of examples 23 or 24 where the plurality of device user biometric inputs are obtained via a background process by one or more device user biometric input devices; and where the biometric authentication circuitry includes buffer circuitry to store device user biometric data for each of the plurality of device user biometric inputs.

Example 26 may include elements of any of examples 23 through 25 where the device user biometric input devices includes one or more image acquisition devices; where the device user biometric input includes facial image data; and where the one or more biometric identification algorithms includes a facial recognition algorithm.

Example 27 may include elements of any of examples 23 through 26 where the biometric authentication circuitry further includes face cropping circuitry to crop facial image data representative of a face of the device user from each of at least some of a plurality of images received from one or more image acquisition devices.

Example 28 may include elements of any of examples 23 through 27, where the security manager circuitry may further: cause the requested application to launch responsive to the false access rate corresponding to the lowest confidence value included in the plurality of confidence values is less than a false acceptance rate threshold value associated with the determined sensitivity level.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of We phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A graded-security system for providing access to portable electronic device applications, the system comprising:
    an image acquisition device configured to capture facial image data of a device user; wherein the facial image data is captured at a rate of about 5 frames per second;
    biometric authentication circuitry to:
    execute one or more facial recognition algorithms using the facial image data, wherein the one or more facial recognition algorithms configured to be executed as a passive background process; and
    generate a plurality of confidence values for the device user by comparing the facial image data to authenticated image data of the device user; and
    security manager circuitry to:
    determine a sensitivity level associated with a requested application responsive to receipt of a user input to access the requested application; and
    compare the determined sensitivity level associated the requested application with a false access rate corresponding to the lowest confidence value included in the plurality of confidence values;
    wherein the one or more facial recognition algorithms to be executed from a time when the user first accesses the device until the false acceptance rate associated with a highest sensitivity level is achieved.

2. The system of claim 1, further comprising machine learning circuitry to adjust confidence values associated with an authorized device user based on facial recognition data associated with the authorized user.

3. The system of claim 1, wherein the biometric authentication circuitry further includes face cropping circuitry to crop the facial image data representative of a face of the device user from each of at least some of a plurality of images received from the image acquisition device.

4. The system of claim 1, the security manager circuitry to further:
    cause the requested application to launch responsive to the false access rate corresponding to the lowest confidence value included in the plurality of confidence values is less than a false acceptance rate threshold value associated with the determined sensitivity level.

5. A graded-security method for providing access to portable electronic device applications, the method comprising:
    capturing, by an image acquisition device, facial image data of a device user; wherein the facial image data is captured at a rate of about 5 frames per second;
    executing, by biometric authentication circuitry, one or more facial recognition algorithms using the facial image data, wherein the one or more facial recognition algorithms configured to be executed as a passive background process;

generating, by the biometric authentication circuitry, a plurality of confidence values for the device user by comparing the facial image data to authenticated image data of the device user;

determining, by security manager circuitry, a sensitivity level associated with a requested application responsive to receipt of a user input to access the requested application; and comparing, by the security manager circuitry, the sensitivity level associated the requested application with a false access rate corresponding to the lowest confidence value included in the plurality of confidence values;

wherein the one or more facial recognition algorithms to be executed from a time when the user first accesses the device until the false acceptance rate associated with a highest sensitivity level is achieved.

6. The method of claim 5, further comprising:
adjusting, by machine learning circuitry, at least one of the confidence values associated with an authorized device user based on facial recognition data associated with the authorized user.

7. The method of claim 5, further comprising:
cropping, by the biometric authentication circuitry, the facial data from at least a portion of the plurality of acquired images prior to the generation of the plurality of confidence values.

8. The method of claim 5, further comprising:
causing the requested application to launch responsive to the false access rate corresponding to the lowest confidence value included in the plurality of confidence values is less than a false acceptance rate threshold value associated with the determined sensitivity level.

9. A non-transitory machine-readable storage medium that includes instructions that, when executed by processor circuitry included in a portable electronic device, cause the processor circuitry to:

capture, by an image acquisition device, facial image data of a device user; wherein the facial image data is captured at a rate of about 5 frames per second;

execute, by biometric authentication circuitry, one or more facial recognition algorithms using the facial image data, wherein the one or more facial recognition algorithms configured to be executed as a passive background process;

generate, by the biometric authentication circuitry, a plurality of confidence values for the device user by comparing the facial image data to authenticated image data of the device user;

determine, by security manager circuitry, a sensitivity level associated with a requested application responsive to receipt of a user input to access the requested application; and compare, by the security manager circuitry, the sensitivity level associated the requested application with a false access rate corresponding to the lowest confidence value included in the plurality of confidence values;

wherein the one or more facial recognition algorithms to be executed from a time when the user first accesses the device until the false acceptance rate associated with a highest sensitivity level is achieved.

10. The non-transitory machine-readable storage medium of claim 9 wherein the instructions further cause the processor circuitry to:
cause machine learning circuitry to adjust at least one of the confidence values associated with an authorized device user using facial recognition data associated with the authorized user of the device.

11. The non-transitory machine-readable storage medium of claim 9 wherein the instructions further cause the processor circuitry to:
cause the biometric authentication circuitry to crop the facial data from at least a portion of the plurality of acquired images prior to the generation of the plurality of confidence values.

12. The non-transitory machine-readable storage medium of claim 9 wherein the instructions further cause the processor circuitry to:
cause the requested application to launch responsive to the false access rate corresponding to the lowest confidence value included in the plurality of confidence values is less than a false acceptance rate threshold value associated with the determined sensitivity level.

* * * * *